(12) United States Patent
Cheriton

(10) Patent No.: US 9,501,421 B1
(45) Date of Patent: Nov. 22, 2016

(54) MEMORY SHARING AND PAGE DEDUPLICATION USING INDIRECT LINES

(75) Inventor: David R. Cheriton, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 438 days.

(21) Appl. No.: 13/541,396

(22) Filed: Jul. 3, 2012

Related U.S. Application Data

(60) Provisional application No. 61/504,669, filed on Jul. 5, 2011.

(51) Int. Cl.
*G06F 12/00* (2006.01)
*G06F 12/10* (2016.01)
*G06F 3/06* (2006.01)

(52) U.S. Cl.
CPC .............. *G06F 12/10* (2013.01); *G06F 3/0608* (2013.01); *G06F 3/0641* (2013.01)

(58) Field of Classification Search
CPC .................... G06F 12/10; G06F 3/0608; G06F 3/0641; G06F 17/30156; G06F 17/30097; G06F 17/30489
See application file for complete search history.

(56) References Cited

U.S. PATENT DOCUMENTS

| | | | |
|---|---|---|---|
| 6,665,787 B2* | 12/2003 | Franaszek et al. | 711/206 |
| 6,789,156 B1* | 9/2004 | Waldspurger | 711/6 |
| 7,523,290 B2* | 4/2009 | Franaszek et al. | 711/206 |
| 7,620,766 B1* | 11/2009 | Waldspurger | 711/6 |
| 7,650,460 B2* | 1/2010 | Cheriton | 711/108 |
| 7,734,603 B1* | 6/2010 | McManis | G06F 3/0608 707/696 |
| 7,747,584 B1* | 6/2010 | Jernigan, IV | G06F 17/30156 707/692 |
| 2008/0005141 A1* | 1/2008 | Zheng | G06F 3/0608 |
| 2009/0164754 A1* | 6/2009 | Cheriton | 712/29 |
| 2010/0042790 A1* | 2/2010 | Mondal | G06F 3/0608 711/161 |
| 2010/0088296 A1* | 4/2010 | Periyagaram | G06F 3/061 707/705 |

(Continued)

OTHER PUBLICATIONS

F. Chen, T. Luo, X. Zhang "CAFTL: A Content-Aware Flash Translation Layer Enhancing the Lifespan of Flash Memory based Solid State Drives" In Proceedings of FAST '11 (San Jose, CA, Feb. 2011).*

(Continued)

*Primary Examiner* — David X Yi
*Assistant Examiner* — Francisco Grullon
(74) *Attorney, Agent, or Firm* — Schwabe, Williamson & Wyatt, P.C.

(57) ABSTRACT

Memory management includes maintaining a plurality of physical pages corresponding to a respective plurality of indirect lines, where each of the plurality of indirect lines corresponds to a set of one or more data lines. Memory management further includes receiving a request to create a new physical page; determining whether there is an existing physical page that has matching content to the new physical page; and in the event that there is an existing physical page that has matching content as the new physical page, associating the new physical page with the same data lines as those corresponding to the matching content referenced by the indirect line associated with the existing physical page.

25 Claims, 11 Drawing Sheets

(56) References Cited

U.S. PATENT DOCUMENTS

2010/0121825 A1* 5/2010 Bates ............... G06F 17/30156
                                                          707/692
2010/0161929 A1* 6/2010 Nation et al. ................ 711/170
2010/0299667 A1* 11/2010 Ahmad et al. .................. 718/1
2011/0271010 A1* 11/2011 Kenchammana et al. .... 709/244

OTHER PUBLICATIONS

C. Waldspurger "Memory Resource Management in VMware ESX Server" Proceedings of the 5th Symposium on Operating Systems Design and Implementation (Boston, MA, Dec. 2002).*
D. Cheriton, A. Firoozshahian, A. Solomatnikov, J. Stevenson, O. Azizi "HICAMP: Architectural Support for Efficient Concurrency-safe Shared Structured Data Access" ASPLOS'12, Mar. 3-7, 2012, London, UK.*

* cited by examiner

MEMORY SHARING AND PAGE DEDUPLICATION USING INDIRECT LINES

CROSS REFERENCE TO OTHER APPLICATIONS

This application claims priority to U.S. Provisional Patent Application No. 61/504,669 entitled MEMORY COMPACTION BY INDIRECT SHARED DATA LINES AND SOFTWARE PAGE DEDUPLICATION filed Jul. 5, 2011 which is incorporated herein by reference for all purposes.

BACKGROUND OF THE INVENTION

Modern software applications often require large amounts of memory. In addition to being a significant part of the capital cost of any computing system, memory systems also incur significant operating costs (such as high energy costs) due to the memory operations.

There have been various efforts to reduce memory usage in computer systems. For example, some existing systems such as the ESX™ by VMWare™ detect for duplicate memory pages and share duplicate pages. Memory deduplication can be a difficult task since it is computationally expensive to scan memory and identify duplicated pages. Moreover, any change to the memory page, however small, results in a different, nonduplicated page that cannot be shared. Additionally, existing deduplicated memory systems tend to have large page sizes (e.g., 2 MB), thus reducing the likelihood of sharing.

BRIEF DESCRIPTION OF THE DRAWINGS

Various embodiments of the invention are disclosed in the following detailed description and the accompanying drawings.

DETAILED DESCRIPTION

Figure 1:
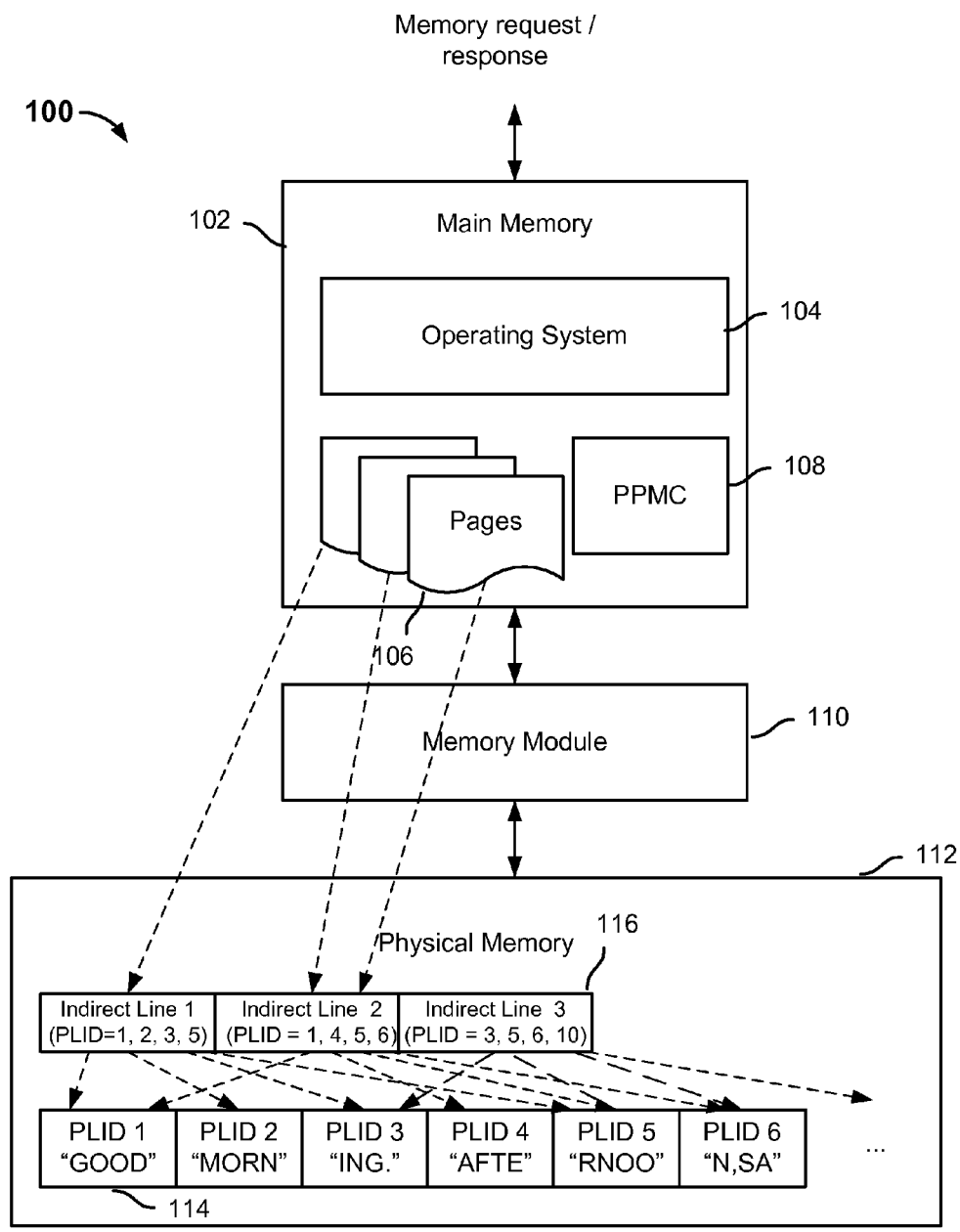
FIG. 1 is a block diagram illustrating an embodiment of a line-sharing memory system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A memory sharing technique is described. In some embodiments, memory sharing is facilitated by the use of a structured memory architecture comprising data lines (such as the Hierarchical Immutable Content Addressable Memory Processor (HICAMP™) by Hicamp Systems of Menlo Park, Calif.). Other appropriate data line based memory architectures can be used. The data lines are configured to store content that remains unchanged until the data line is deallocated and reallocated with new content. Memory pages (in particular physical pages supported by physical memory hardware) are mapped to indirect lines of data that correspond to data lines in a physical memory. When a new page with certain content is to be created, any existing page with matching content is identified, and the same indirect line is shared by the existing page and the new page. When there is no existing page with matching content, a new indirect line is created. When a shared page is written (modified) with certain content and a copy-on-write operation is performed, an indirect copy of its corresponding indirect line is obtained, any modification is performed on the indirect copy, and the page becomes associated with the indirect copy instead. Data lines including portions of the content to be modified are determined and become associated with the indirect line. This way, data is shared whenever possible and duplication is reduced.

FIG. 1 is a block diagram illustrating an embodiment of a line-sharing memory system. The shared memory system can be a part of a computing device (such as a computer, a smart phone, or any other appropriate device). In this example, memory system 100 includes a main memory 102, a memory module 110, and a physical memory 112.

Main memory 102 stores program instructions such as application code and operating system code, as well as other (optional) data structures for facilitating memory management and content sharing, such as physical pages and a physical page map collection (PPMC) that maintains a mapping of physical pages and supports lookup of specific physical pages. Details of the data structures and their uses are described below.

Operating system 104 receives memory requests from other parts of the device (not shown), such as processors, disk drives, networking interfaces, etc. Memory module 110, which includes communications interfaces, a control circuit, and optionally a processor and appropriate software/firmware, cooperates with the operating system to process memory requests and to facilitate memory sharing. As will be described in greater detail below, in some embodiments, the operating system traps the memory requests and forwards them to the memory module, which uses the PPMC 108 to identify any duplicated page when a page is to be created and to determine duplicated/sharable content when a page is to be modified.

Physical memory 112 includes hardware memory that supports the physical pages needed by the software. It can be implemented using dynamic random-access memory (DRAM), static dynamic random-access memory (SRAM), phase-change memory (PCM), Random Access Memory (RAM), or any other appropriate memory device. Physical memory 112 and main memory 102 can be implemented as separate components (e.g., different memory devices) or the same component (e.g., the same memory device). In some embodiments, the operating system code is stored in the main memory, and data is stored in the physical memory. In this example, the memory module and the physical memory together function as a structured memory; specifically, the HICAMP memory architecture is implemented. As shown, a portion of the physical memory includes an array of small (e.g., on the order of a few to a few hundred bytes) data lines 114, also referred to as data segments. Each data line is addressed by a physical line identifier (PLID) and has unique content that is immutable for the life of the line. In other words, the content of each data line is not duplicated. Once a data line is created and populated with data, its content does not change until the memory line is deallocated and reallocated to contain different content In the diagram shown, each physical page 106 (e.g., a page of memory that is supported by physical memory hardware) maps to an indirect line 116, which is a logical organization of an ordered set of data lines that includes specific content (e.g., content of the page). Duplicate pages are detected at the time of page creation and are configured to share the same indirect line. Further, since the data lines each contain unique content, multiple indirect lines with data that is at least in part identical can share the same data line.

As described herein, a physical page is said to reference an indirect line, which means that the physical page can be represented as an indirect line, point to the address of an indirect line, reference an indirect line using an indirect line identifier or the like, or otherwise be associated with an indirect line. An indirect line is said to reference a set of data lines, which means that the indirect line can point to the addresses of data lines, reference data lines using data line identifiers (also referred to as PLIDs) or the like, or otherwise be associated with its corresponding set of data lines.

The size and number of pages, indirect lines, and data lines shown in this and other examples are for purposes of illustration only and can vary in other embodiments. For example, in some embodiments, each physical page is 4 kilobytes, each data line is 64 bytes, and each indirect line is 256 bytes (which includes 64 4-byte entries each containing an identifier (or address) for a sharable data line). With 32 bits of identifier/address for 64-byte units, the physical memory size can be up to 256 gigabytes. Although fixed sizes are discussed in the examples below, in some embodiments, variable sizes are allowed (for example, a system may support multiple modes where the unit sizes vary for different modes).

In some embodiments, the memory is accessed as a number of segments, where each segment is structured as a directed acyclic graph ("DAG") of data lines. A segment table maps each segment to the PLID that represents the root of the DAG. Segments are identified and accessed by segment identifiers ("SegID"). Special-purpose registers in the processor (referred to as iterator registers) allow efficient access to data stored in the segments, including loading data from the DAG, iteration, prefetching, and updates of the segment contents.

In some embodiments, the physical memory address includes a physical page number and an offset within the page. The physical page number is used to index the corresponding indirect line, and the offset is used to determine the entry in the indirect line corresponding to this offset, and further the offset within the data line being accessed. For example, in a memory system where the data lines are 64 bytes each, the physical memory address of physical page 2, offset of 70 bytes corresponds to Indirect Line 2, at 6 bytes offset from the beginning of the second data line within Indirect Line 2.

Figure 2:
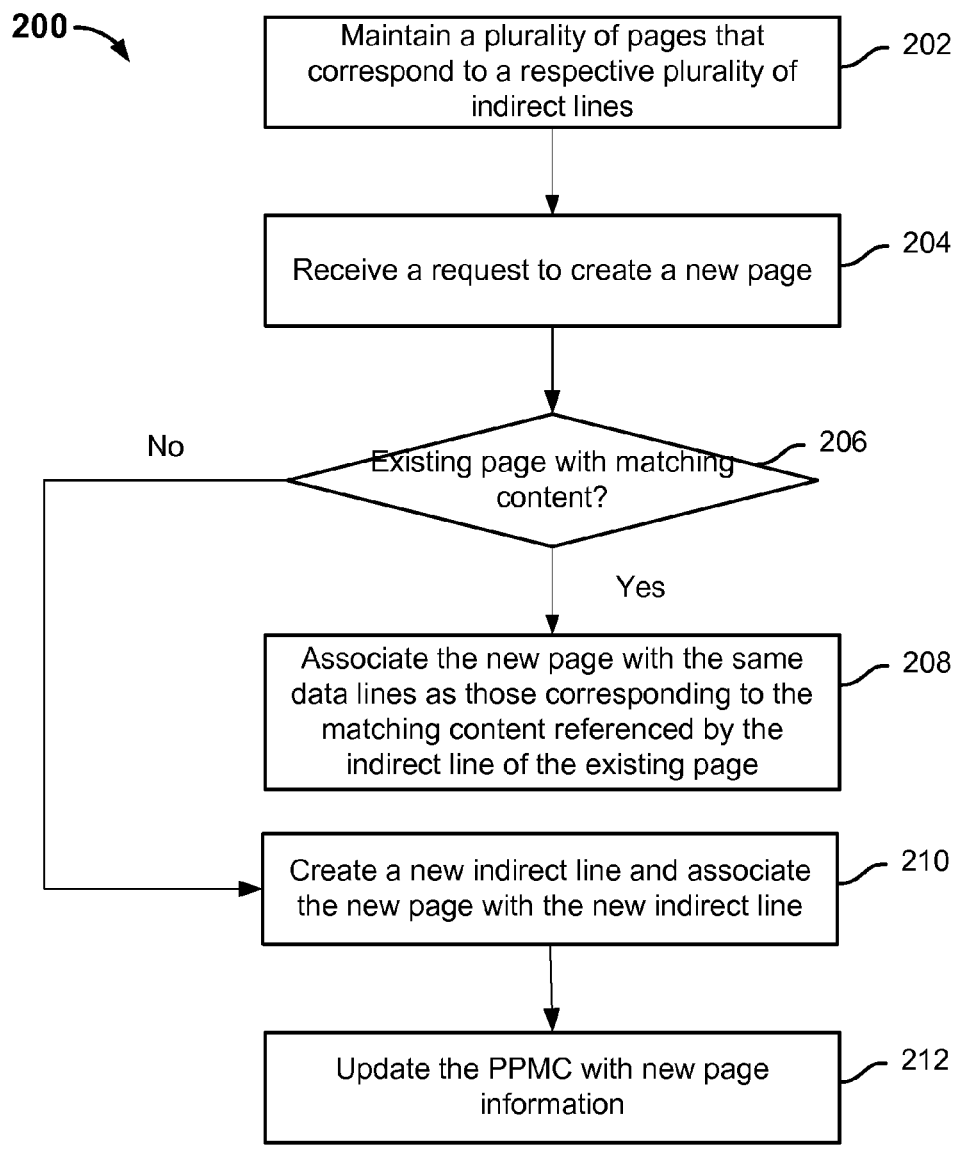
FIG. 2 is a flowchart illustrating an embodiment of a process for handling a page creation request.

FIG. 2 is a flowchart illustrating an embodiment of a process for handling a page creation request. Process 200 may be performed on a system such as 100.

At 202, a plurality of physical pages, a plurality of indirect lines, and their correspondence relationship are maintained. In some embodiments, the association between the physical page and the indirect line is stored in the main memory. In some embodiments, a physical page n is represented by indirect line n, and is located at n*LineSize+BaseAddress of line region start. Each physical page is created to have unique content, although it is possible that some pages may have some portions of content that are identical, and pages may incidentally become identical through later modification.

At 204, a request to create a new page is received. The request may be a read operation or a new operation initiated by a file system, a networking application, or the like. For example, when a software application executing in the main memory performs a read operation of a block of data that is currently stored on disk, a virtual page read operation is carried out by the application. Since the data is on disk and not yet in memory, a page fault exception occurs. In response to the exception, the operating system will retrieve the block of data from disk and make a request for one or more new physical pages to be created based on the retrieved data, so that the data is kept in memory (e.g., main memory).

At 206, it is determined whether there is an existing page with matching content to the new page. In some embodiments, the content or an identifier associated with the content is looked up in the PPMC to identify any existing page with the same content. Examples of the PPMC and its related functions are described in greater detail below in connection with Tables 1-8. In some embodiments, the determination is made based on other information, such as knowledge about the context of the new page creation (e.g., if the new page is known to be a copy of an original page, then the original page is the existing page.)

If an existing identical page is identified, its content can be shared with the new page by sharing the same indirect line. At 208, the new page is associated with the same data lines as those corresponding to the matching content referenced by the indirect line of the existing page. In some embodiments, the association is made by associating the new page with the indirect line of the existing page. For example, the new page can point to the address of the indirect line, reference the indirect line by an indirect line identifier, or the like. The virtual memory mapping entry corresponding to the virtual page that caused the exception is changed to refer to the physical address of this page and set to read-only access, so a subsequent trap takes place on write to make a copy of this page.

In some embodiments, the new page is associated with a copy of the indirect line of the existing page, and thus becomes associated with the same data lines as those corresponding to the matching content referenced by the indirect line of the existing page. For example, when the virtual page is likely to be written subsequently, the operating system invokes the memory module to make a copy of the existing page to a new physical page, causing the memory module to set all the PLID values in the indirect line corresponding to this new physical page to be equal to that of the existing page, thereby sharing the data lines with the original existing page. In this case, the virtual memory mapping is set to allow write access to the page, eliminating the overhead of a subsequent trap on the first write.

If, however, no such existing page is found in 206, then, at 210, a new indirect line is created and becomes associated with the new page. The new indirect line will correspond to an ordered set of data lines that stores the new page content. Each data line may store a portion of the new page content. In some embodiments, if a portion of the new page content is found in an existing data line, the indirect line just references the existing data line instead of creating a new data line. If no existing matching data line is found, a new data line is created to include the portion of the new page content, and becomes associated with the indirect line. Also, the PPMC is updated with the new page, at 212.

In some embodiments, strict deduplication of data lines is not required, and new data lines can be created without checking for duplicates. Although permitting duplication at the data line level is less memory efficient, the implementation is faster since it does not require checking for duplicates. In some embodiments, a separate garbage collection process can sweep through periodically to identify duplicate data lines, make any indirect lines referencing duplicate data lines share a single one of the data lines, and remove the rest of the duplicated data lines.

Through the above process, common, matching data is identified and shared. For example, suppose that a file system needs to read a specific portion of a file and makes a page create request, and the same content already exists in memory. Using the memory sharing technique described above, the content does not need to be created again, saving both memory and processing resources.

In some embodiments, a special address is reserved for a zero data line which is filled with zeros. A page and an associated indirect line that have zeros in their content can reference this special zero data line. A special zero indirect line that references to only this data line is also reserved. To create a page that is filled with zeros, the new page is associated with the zero indirect line and no additional copying is needed. Since a page filled with zeros is often needed (for example, when data structures are initialized), the reserved data line and indirect line allow such a page to be created efficiently. In some embodiments, a special zero page that maps to the zero indirect line is reserved, such that when a new page needs to be allocated without separate initialization from the disk, the network, or other source of data, the special zero page is returned to the requester of the new page. A read to the zero page/indirect line/data line returns 0 at all of its offsets. On write, the zero page/indirect line/data line are treated and shared in the same way as other pages/indirect lines/data lines. Given the prevalence of zeros in data content, the use of the special zero page/indirect line/data line can result in significant savings in space.

In the above example, a PPMC is used to facilitate the determination of whether a page with specific content already exists. In some embodiments, the PPMC is maintained by software (e.g., the operating system) and provides a mapping of lookup keys to physical pages. When the content of a new page is loaded from disk, network, or other sources, the content of the new page is compared with those of the pages in the PPMC. If a matching page is found, the existing (matching) page is used in placed of the new page, and the virtual memory mapping to this page is set to be read-only or copy-on-write.

In various embodiments, the PPMC is implemented as a hash table using hash values of the page content as lookup keys, an identifier-based table using file identifier and offset as lookup keys, or any other appropriate data structure that allows identification of existing pages containing specific content. In some embodiments, the PPMC is supported by hardware for fast lookup and comparison. For example, a hardware hash table or the like is implemented in an Application Specific Integrated Circuit (ASIC), where a dedicated circuit is used to implement the hash function. As another example, the table can be stored in hardware, using dedicated registers that are addressed by the hash values or identifier values. Any other appropriate hardware-based table implementation can be used.

Table 1 illustrates an example PPMC implemented as a hash table. The content of each page is hashed using a hash function such as Jenkins hash, and the hash result is used as the index of the table. Each hash key may map to multiple pages. When a lookup is performed, since there is the possibility of a hash collision (i.e., multiple pages being hashed to the same hash key), the content of the page being looked up is compared with the content of the page entry(ies) with the same hash key to ascertain that an actual matching page has been found. When a new page is created, its content is hashed. The hash key and the page are added as an entry in the table. When a page is modified, its corresponding entry in the table is updated (the old hash key-page mapping entry is deleted, and a new hash key-page mapping entry is added).

TABLE 1

| Index | Page |
| --- | --- |
| 00010010 | P121, P920, P6877 |
| 00110100 | P509, P18 |
| 00111001 | — |
| 01100100 | P3121 |
| . . . | . . . |

Table 2 is an example of an identifier-based mapping table. Each page is identified by an identifier, such as a combination of a document identifier (e.g., a file name or a file identifier assigned by the operating system, a URL, or a URL identifier, etc.) and an address (or an offset from the base address of the file). Such a table allows fast determination of whether a page already exists, since the determination is made based on identifiers and does not require the actual content of the page to be read via an I/O operation. While such a mapping table does not guarantee absolute uniqueness (since the same content shared by two different files would correspond to different pages), it still ensures that the same page within the same file is not duplicated.

TABLE 2

| Identifier | | |
| --- | --- | --- |
| File ID | Offset | Page |
| 0013 | 0 | P858 |
| 0013 | 4096 | P859 |
| 0013 | 8192 | P860 |
| 0013 | 98304 | P2177 |
| ... | ... | ... |
| 0037 | 69632 | P3941 |
| ... | ... | ... |

Many other ways to organize the PPMC exist. For example, in the examples above, each physical page corresponds to one PPMC entry. In some embodiments, a physical page can correspond to multiple PPMC entries. For example, a physical page can be divided into multiple blocks, and the PPMC can store hashes/identifiers at the block level. For instance, a physical page that is 4 kilobytes in size can be divided into two blocks, resulting in 2 hash values. When a determination of whether matching content already exists needs to be made, the first 2 kilobytes is hashed and the result is looked up in the PPMC, and the second 2 kilobytes is also hashed and the result is looked up in the PPMC. Sharing can therefore be done at the 2 kilobyte block level.

Figure 3A:
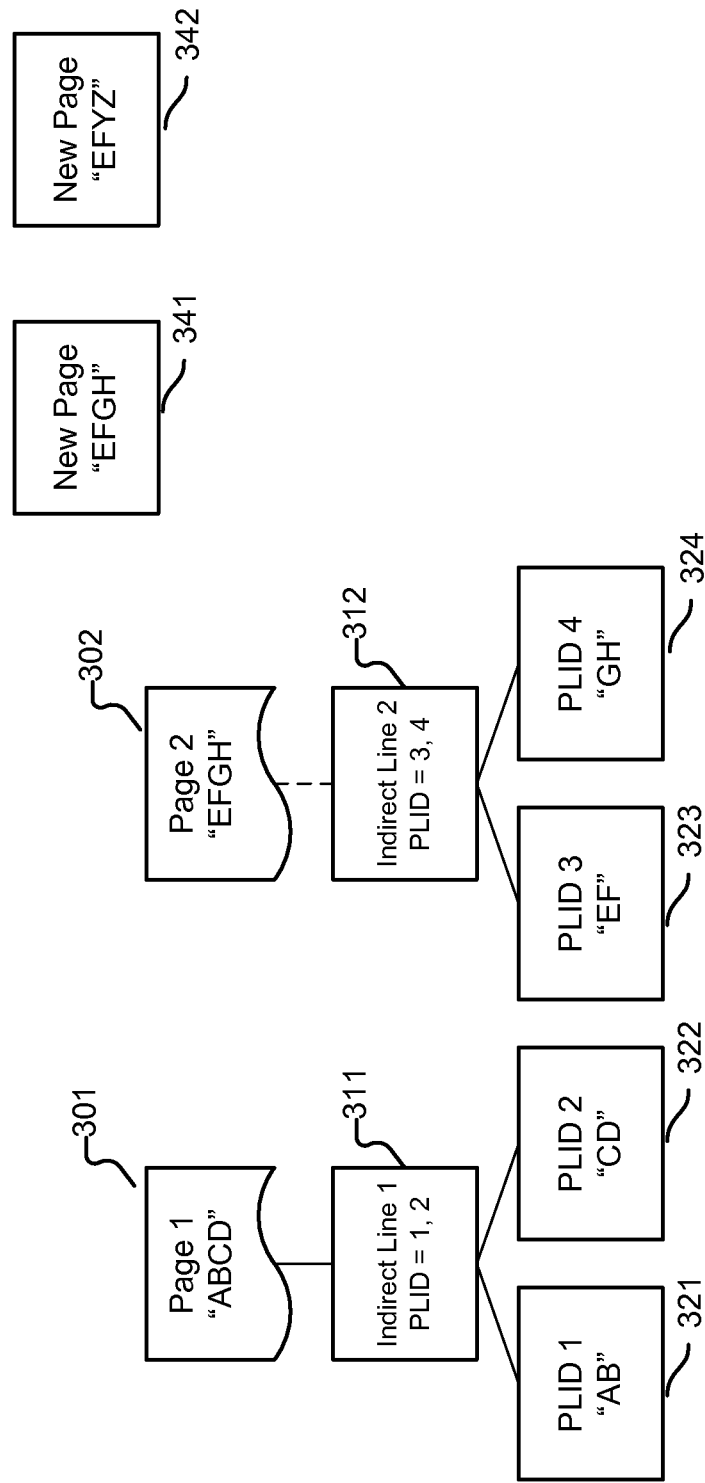
FIGS. 3A-3C are data diagrams illustrating an example of a new page creation process.
Figure 3B:
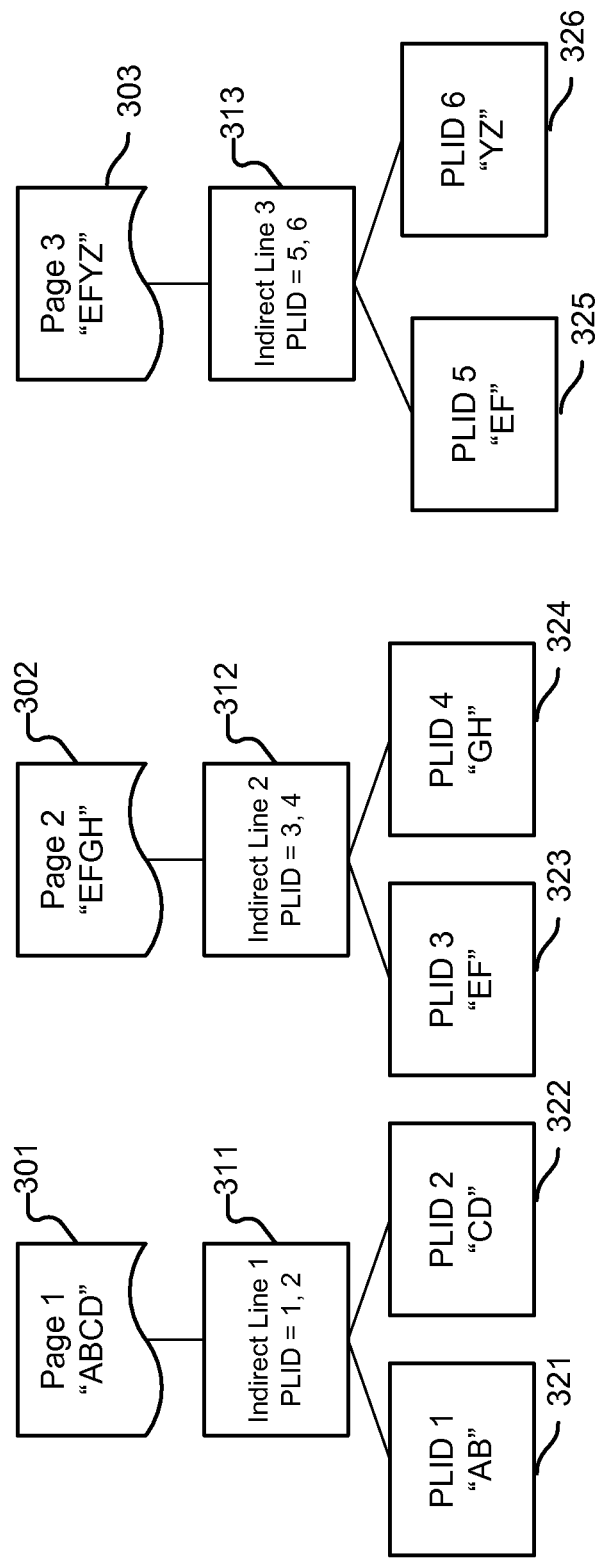

FIGS. 3A-3B are data diagrams illustrating an example of a new page creation process. FIG. 3A shows that, at the beginning of the process, the memory system maintains two physical pages: Page 1 (301) which is associated with Indirect Line 1 (311), which in turn is associated with PLID 1 (321) and PLID 2 (322); and Page 2 (302) which is associated with Indirect Line 2 (312), which in turn is associated with PLID 3 (323) and PLID 4 (324). As shown, PLIDs 1, 2, 3, and 4 correspond to the content of "AB", "CD", "EF", and "GH", respectively. Accordingly, Page 1 corresponds to the content of "ABCD" and Page 2 corresponds to the content of "EFGH". Two new page creation requests 341 and 342 are received, one for creating a new page with the content of "EFGH" and another for creating a new page with the content of "EFYZ".

In embodiments where a hash value based PPMC table is used, the initial table includes two entries (a first entry mapping the hash key generated based on "ABCD" to Page 1; and a second entry mapping the hash key generated based on "EFGH" to Page 2), as shown in Table 3 below:

TABLE 3

| Index | Page |
| --- | --- |
| 01001010 | P1 |
| 01011001 | P2 |

In embodiments where an identifier-based PPMC is used, the table representing the initial state also includes two entries (a first entry mapping the file identifier and the offset where the content "ABCD" is located to Page 1, and a second entry mapping the file identifier and the offset where the content "EFGH" is located to Page 2), as shown in Table 4 below:

TABLE 4

| Identifier | | |
| --- | --- | --- |
| File ID | Offset | Page |
| 0021 | 0 | P1 |
| 0021 | 4 | P2 |

The results of the page creation process is shown in FIG. 3B. A content comparison of "EFGH" with existing pages identifies an existing page that has matching content, namely Page 2 (302). Thus, a new page is not created and Page 2 is returned to the requester. For example, if the new page creation request is made by the file system, the memory module will return Page 2 to the operating system, which will return Page 2 to the file system. Since Page 2 is shared, the virtual memory mapping to this page is set to be read-only or copy-on-write such that when a caller attempts to modify Page 2, a private copy is created for that caller to prevent the modifications from becoming visible to other processes or threads sharing this page.

In contrast, a content comparison of "EFYZ" with existing pages does not identify any existing page with matching content. Thus, a new page (Page 3 (303)) and a new indirect line (Indirect Line 3 (313)) associated with the new page are created. As shown in FIG. 3B, new data lines (PLID 5 (325) and PLID 6 (326)) are created to be associated with the new indirect line.

Figure 3C:
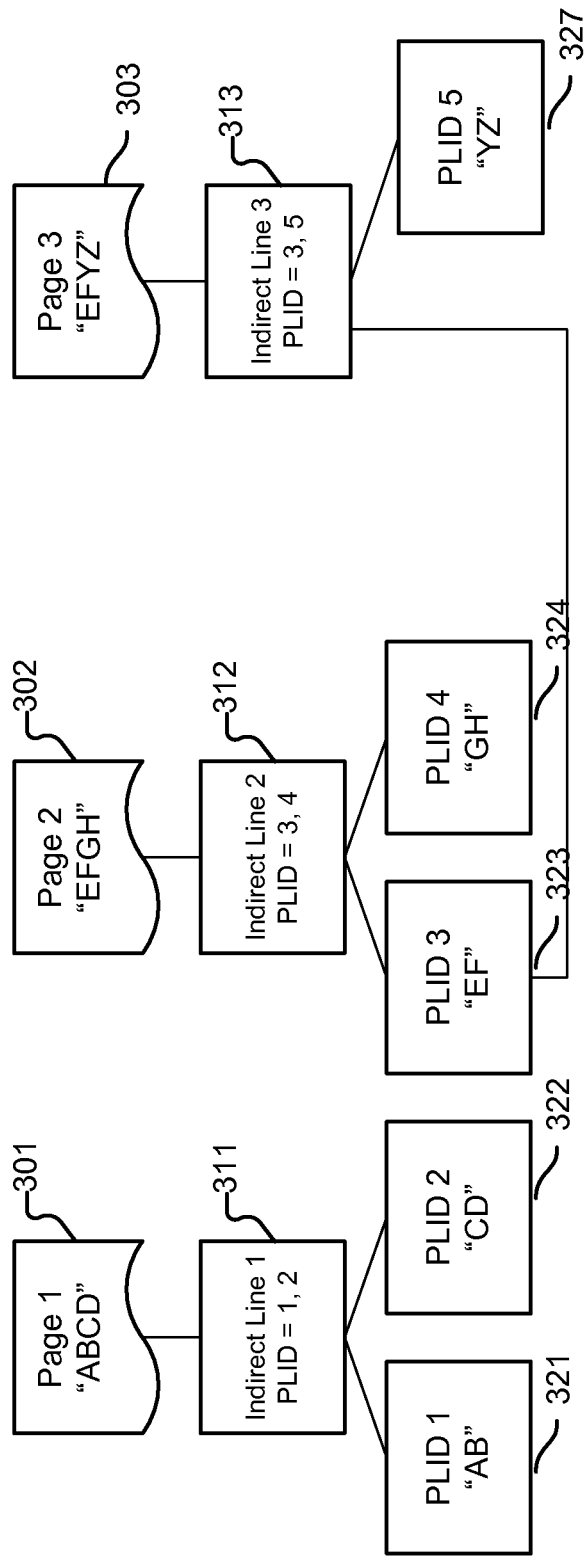

In some embodiments, further deduplication at the data line level is supported. As shown in FIG. 3C, it is further determined that a data line containing "EF" already exists and is referenced by PLID 3 (323). Thus, this data line is reused. No data line containing "YZ" is in existence at this point. Thus, a new data line (PLID 5 (327)) with the content of "YZ" is created. Indirect line 3 (313) therefore corresponds to data lines with PLIDS of 3 and 5 (323 and 327).

The hash value based PPMC is updated to include an additional entry mapping the hash key generated based on "EFGH" to Page 3, as shown in Table 5 below:

TABLE 5

| Index | Page |
| --- | --- |
| 01001010 | P1 |
| 01011001 | P2 |
| 01100010 | P3 |

The identifier-based PPMC is updated to include a third entry mapping the file identifier and the offset where the content "EFYZ" is located to Page 3, as shown in Table 6 below:

TABLE 6

| Identifier | | |
| --- | --- | --- |
| File ID | Offset | Page |
| 0021 | 0 | P1 |
| 0021 | 4 | P2 |
| 0021 | 8 | P3 |

Figure 4:
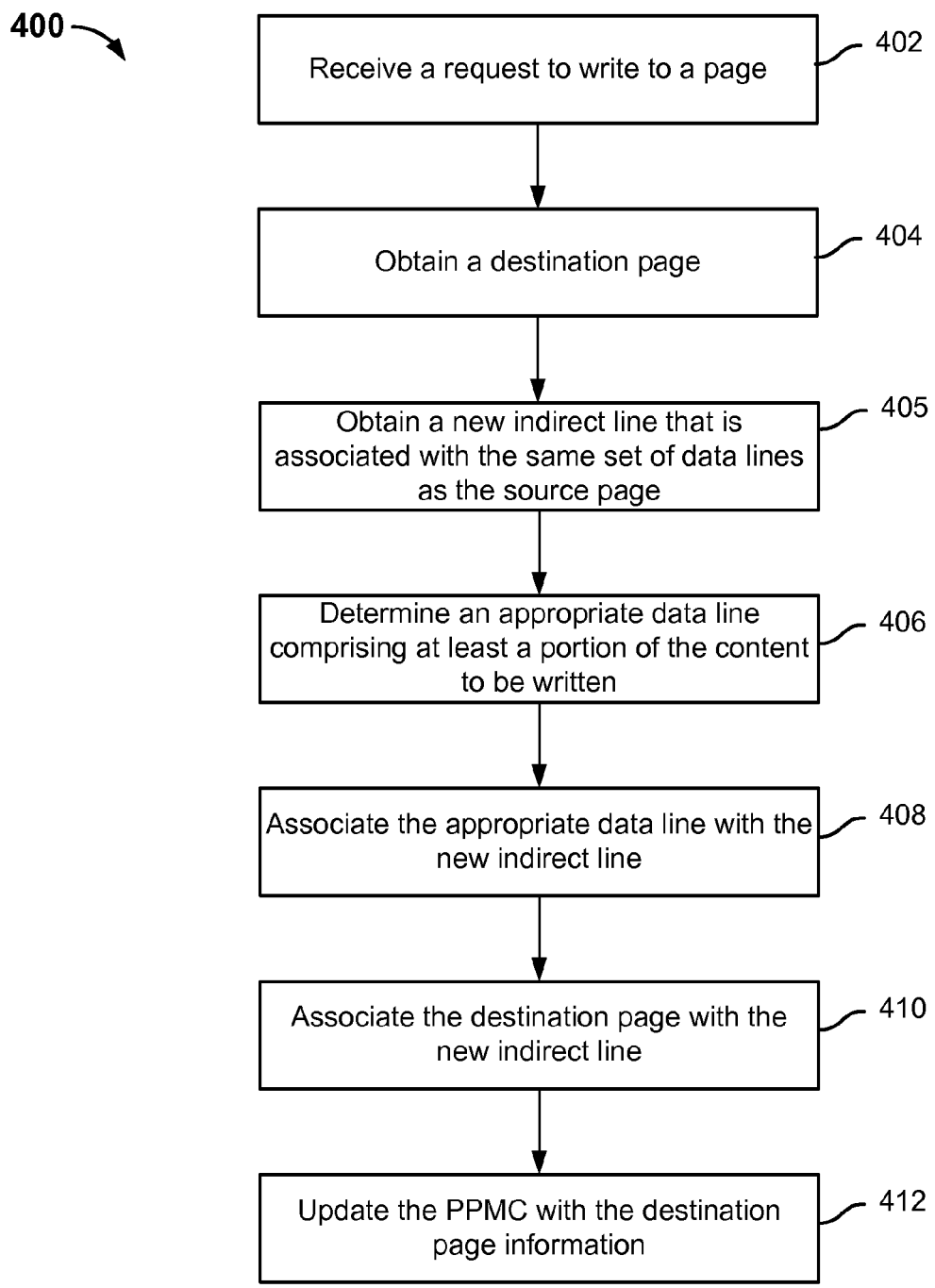
FIG. 4 is a flowchart illustrating an embodiment of a copy-on-write process.

In some embodiments, shared pages such as Page 2 are set to be copy-on-write. FIG. 4 is a flowchart illustrating an embodiment of a copy-on-write process. Process 400 can be performed on a system such as 100. The process makes an indirect copy of a page to be modified, and identifies any duplicate data in the content to be modified. If some of the content to be modified is sharable, it is shared.

As used herein, an indirect copy refers to a logical copy of data achieved by copying the PLIDs of the indirect line(s) corresponding to the source to the corresponding offsets into the indirect lines corresponding to the destination so that the destination includes the desired (i.e. source) data. After an indirect copy, the data lines are shared between the source and the destination. An indirect copy is less expensive than a conventional direct copy of the data lines since the PLIDs are copied rather than the actual data contained in the data lines. Also, an indirect copy consumes less memory because the data storage is shared between source and destination.

In some embodiments, an indirect copy can be performed by logic in the hardware memory controller. In some embodiments, an indirect copy is only allowed when the source and destinations are specified to be aligned compatibly relative to data line boundaries. For instance, the indirect copy may be restricted to copies in which both the source and destination start on page boundaries and the length of the copy is a multiple of the page size, i.e. corresponding to an integral number of indirect lines.

At 402, a request to write to a page is received. In some embodiments, the write request includes the content to be modified and the location to be modified (for example, starting from the base address of Page 2 with an offset of 2 byte, write "EF"). In some embodiments, the write request is initiated by an application, triggers an operating system trap, and invokes a copy-on-write handler.

The trap handler performs an indirect copy of the page to be modified (referred to as the source page) to a new page (referred to as the destination page). Specifically, at 404, a destination page is obtained. At 405, a new indirect line is obtained that points to or references the same ordered set of data lines as the source page. In some embodiments, the new indirect line is created on demand, i.e., after the write request is received. In some embodiments, the new indirect line is created ahead of time and cached (such as at the time the page is created, when a matching page is found by a read operation, or at some other point in time before the write request is received) in anticipation of future read-on-write requests. Since the indirect copy operation of the indirect line involves creating the new indirect line and associating the new indirect line with the same set of data lines as the source page, rather than copying the actual content of the data lines, the operation is highly efficient. In some embodiments, there is hardware support to perform the indirect copy (e.g., logic implemented to carry out the steps described).

At 406, one or more appropriate data lines that comprise at least a portion of the content to be modified are determined. In some embodiments, data lines with the content to be modified are created. In some embodiments where the memory architecture supports further detection of duplication at data line level (e.g., the HICAMP architecture which organizes the data lines into DAGs which facilitate quick lookup and identification of the data lines,) the one or more appropriate data lines can be determined by comparing the portion of the content to be modified with the content of existing data lines maintained by the memory module. In some cases, no existing data lines can be located that contain portions of the content to be modified, and the appropriate data line is generated to include the portion of the content to be modified.

At 408, the one or more appropriate data lines are associated with the new indirect line. For example, pointers or references can be set between the copy of the indirect line and the one or more appropriate data lines.

At 410, the destination page is associated with the new indirect line. For example, pointers or references can be set between the page to be written and the new indirect line.

At 412, the PPMC is updated with the destination page information. For example, in embodiments where a hash based table is used, a new hash key based on the modified content is generated, and a new entry comprising the new hash key and the destination page identifier is added to the table; in embodiments where an identifier-based table is used, the existing identifier is associated with the new destination page. At this point, the old source page is not necessarily removed since the page is shared by others.

Figure 5A:
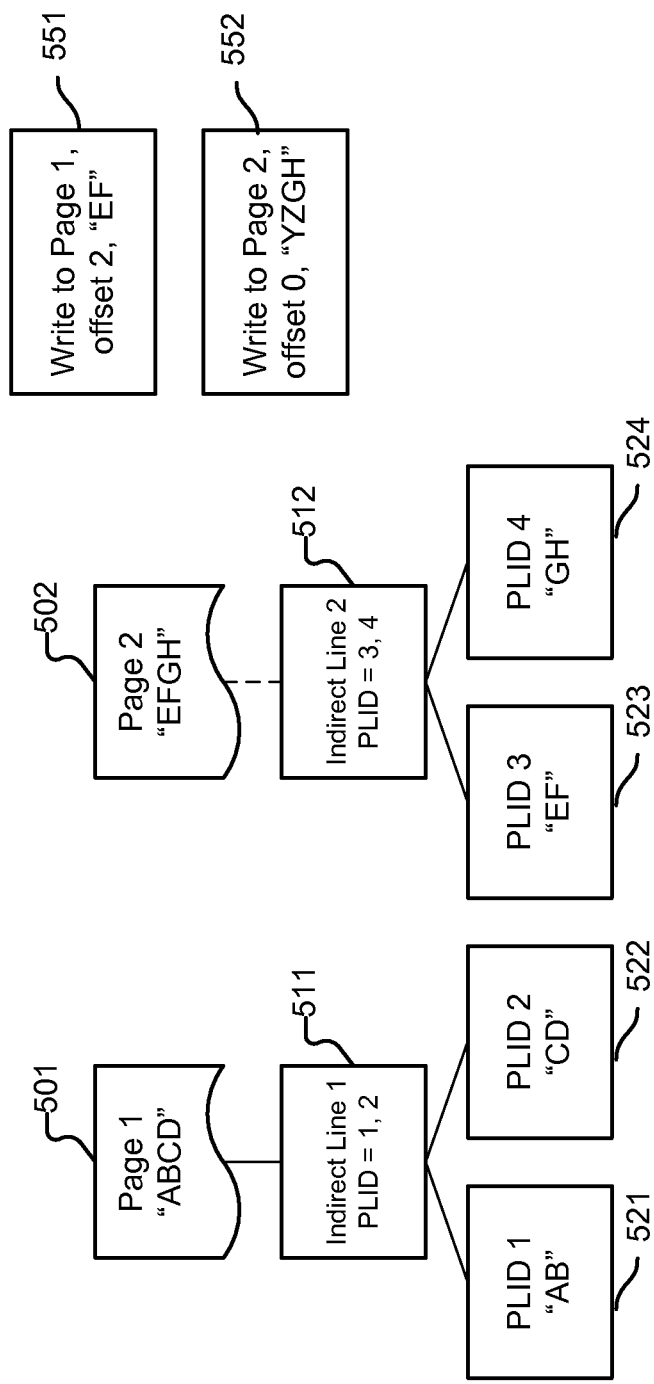
FIGS. 5A-5C are data diagrams illustrating a write process.
Figure 5B:
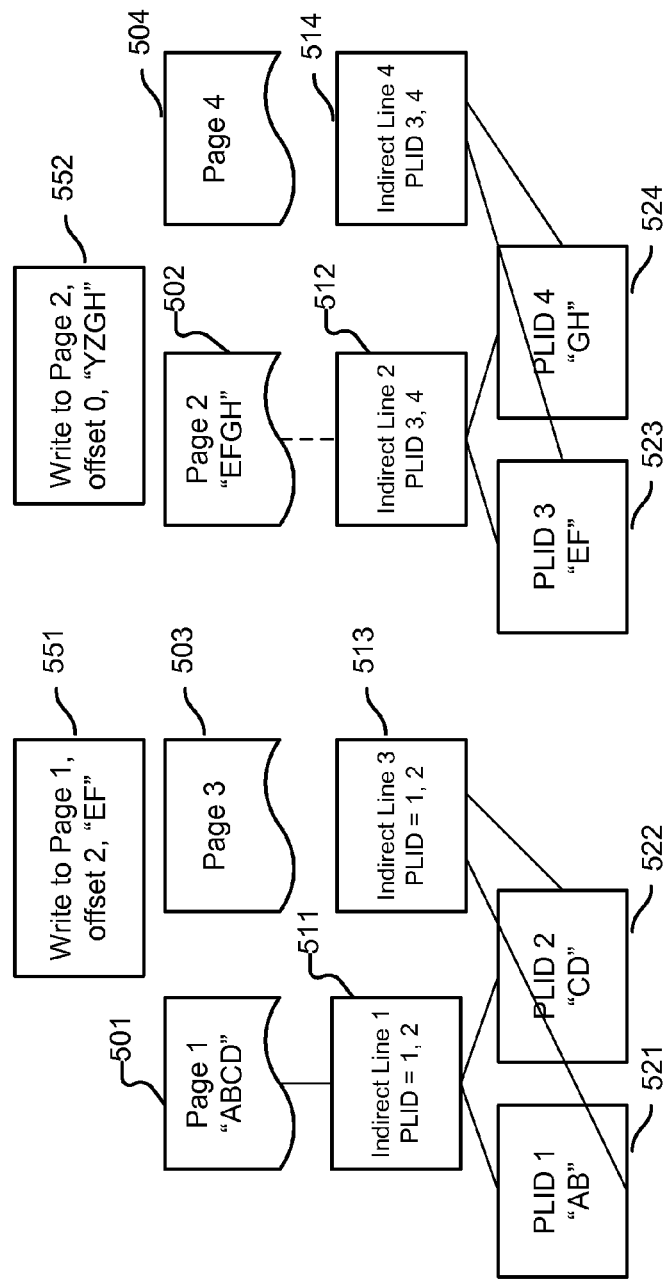

FIGS. 5A and 5B are data diagrams illustrating a write process. As shown in FIG. 5A, suppose that at the beginning of the process, the memory system is in the same state as shown in FIG. 3A. In this example, one write request (551) is for writing to Page 1 (501), at an offset of 2 bytes, "EF". Another write request (552) is for writing to Page 2 (502), at an offset of 0 bytes, "YZGH". The initial PPMC table may resemble Table 3 or Table 4.

As shown in FIG. 5B, new destination pages 3 (503) and 4 (504) are obtained. In addition, an indirect copy of Indirect Line 1 511 (Indirect Line 3 (513)) and an indirect copy of Indirect Line 2 512 (Indirect Line 4 (514)) are also obtained. Each copy references the same set of data lines as the source.

Figure 5C:
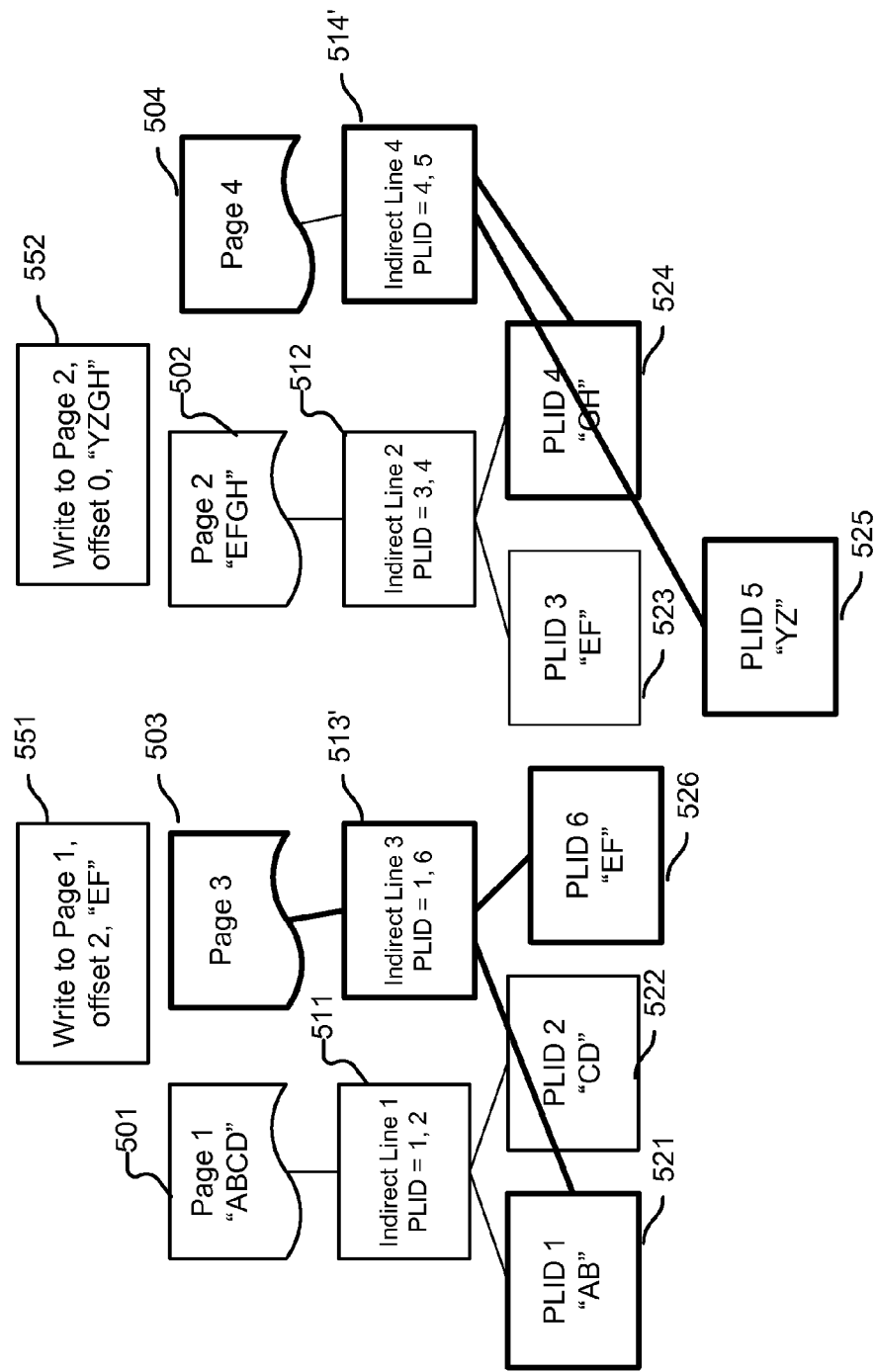

In FIG. 5C, data lines that correspond to the modified content are obtained and associated with the indirect copies of the indirect lines. Specifically, PLID 6 (526) ("EF") and PLID 5 (525) ("YZ") replace PLID 2 (522) ("CD") and PLID 3 (523) ("EF"), respectively. New pages 3 and 4 are thus created. Since the indirect line of the source page is copied to the destination page, only the modified data line is not shared between the source page and the destination page after the write operation completes. Note that there is an existing data line PLID 3 ("EF") that has the same content as the modified content for Page 3. Although in the example shown, the existing data line with duplicated content is not detected or reused across different destination pages, in some embodiments with special support for detecting specific content in data lines, PLID 3 can be reused by new Page 3 and no new PLID 6 needs to be generated.

The hash value based PPMC is updated to include two additional entries, mapping the hash key generated based on "ABEF" to Page 3 and mapping the hash key generated based on "YZGH" to Page 4, as shown in Table 7 below:

TABLE 7

| Index | Page |
|---|---|
| 01001010 | P1 |
| 01011001 | P2 |
| 01101010 | P4 |
| 01110001 | P3 |

The identifier-based PPMC is updated to include additional pages referenced by the same identifiers, as shown in Table 8 below:

TABLE 8

| Identifier | | |
|---|---|---|
| File ID | Offset | Page |
| 0021 | 0 | P1, P3 |
| 0021 | 4 | P2, P4 |

Figure 6:
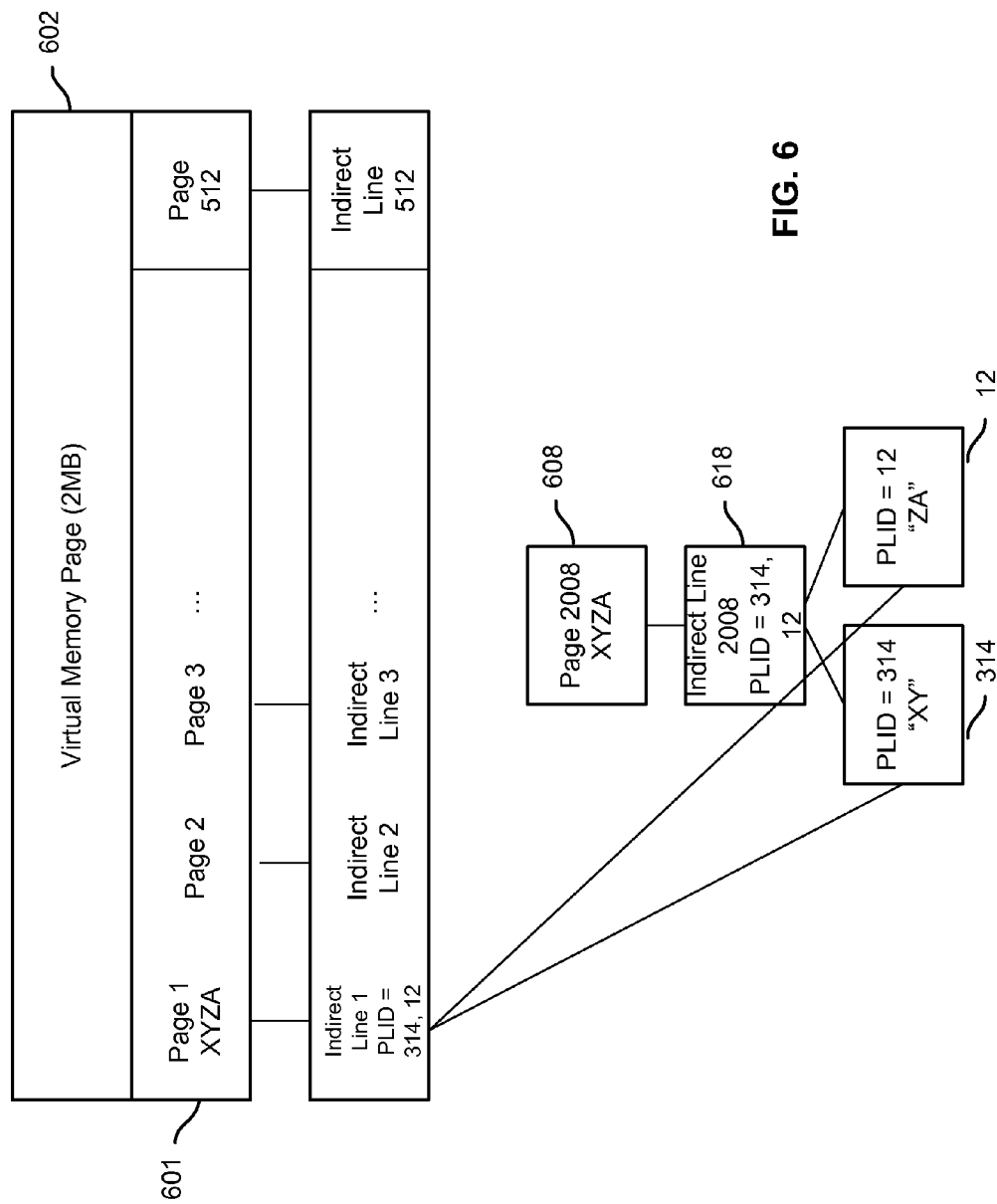
FIG. 6 is a data diagram illustrating an example where the virtual memory page is greater than the physical memory page.

In the examples above, it is assumed that the virtual memory page is the same size as the physical page. In some embodiments, however, sometimes a virtual memory page is larger than the physical page such that a virtual page corresponds to a plurality of physical pages. In such cases, sharing can still be accomplished by using indirect lines. FIG. 6 is a data diagram illustrating an example where the virtual memory page is greater than the physical memory page. In this example, virtual memory page 602 is set to 2 megabytes, and the physical memory page is set to 4 kilobytes. Thus, a contiguous block of 512 physical pages are needed for storing data in this virtual memory page. Each physical page corresponds to an indirect line.

In some embodiments, sharing is done on per-page (and per-indirect line) basis. For example, suppose that Page 1 (601) has the content of "XYZA". To create Page 1 with this content, the content is looked up in the PPMC to determine whether there is an existing page with this content. In this case, a page 2008 (608) has the same content. Its corresponding indirect line (Indirect Line 2008 (618)) references data lines 314 and 12. Since Page 2008 does not appear in the contiguous block of physical page, Page 1's corresponding indirect line (Indirect Line 1), it cannot be shared by Page 1 directly. Therefore, Indirect Line 2008 is indirectly copied into Indirect Line 1 so that Indirect Line 1 references data lines 314 and 12. The rest of the pages and indirect lines can be similarly processed.

Because Page 1 is a new, unshared copy rather than a shared copy, when a write operation needs to write to Page 1, it can be modified without making an extra copy. For example, if the content of Page 1 is to be modified to "XYDE" and it is found that data line 200 has the content of "DE", then Indirect Line 1 is associated with data lines 314 and 200, without requiring its original associations with data lines 314 and 12 to be copied first.

In this example, the PPMC is maintained per physical page. In some embodiments where the virtual page size is greater than the physical memory page size, the physical pages of a virtual memory page are treated as a block and the PPMC is maintained as multiple consecutive physical pages associated with the virtual page per entry. In other words, sharing is done on a per virtual page size basis. For example, an entry can comprise identifiers or an address range of multiple consecutive physical pages, and a hash key based on their content. Thus, each time a new virtual page requires new physical pages to be created, the set of new pages are treated as a whole so there is a single deduplication check on each new virtual page creation. If an existing block of identical page frame is found, it is shared, and the virtual page is marked as read-only/copy-on-write. In other words, when the physical pages are treated as a single block, the create operation is handled in a similar fashion as described above in connection with FIGS. 3A and 3B, where the virtual page and physical page are of the same size.

On write to a read-only/copy-on-write page, a trap is triggered and the operating system trap handler first performs an indirect copy of the original block of physical pages to a new page frame. It then changes the virtual memory page mapping to point to the new page frame. At this point, a new indirect line contains pointers to the same shared data lines as the original page. The write operation is allowed to proceed and appropriate modifications are performed.

Figure 7A:
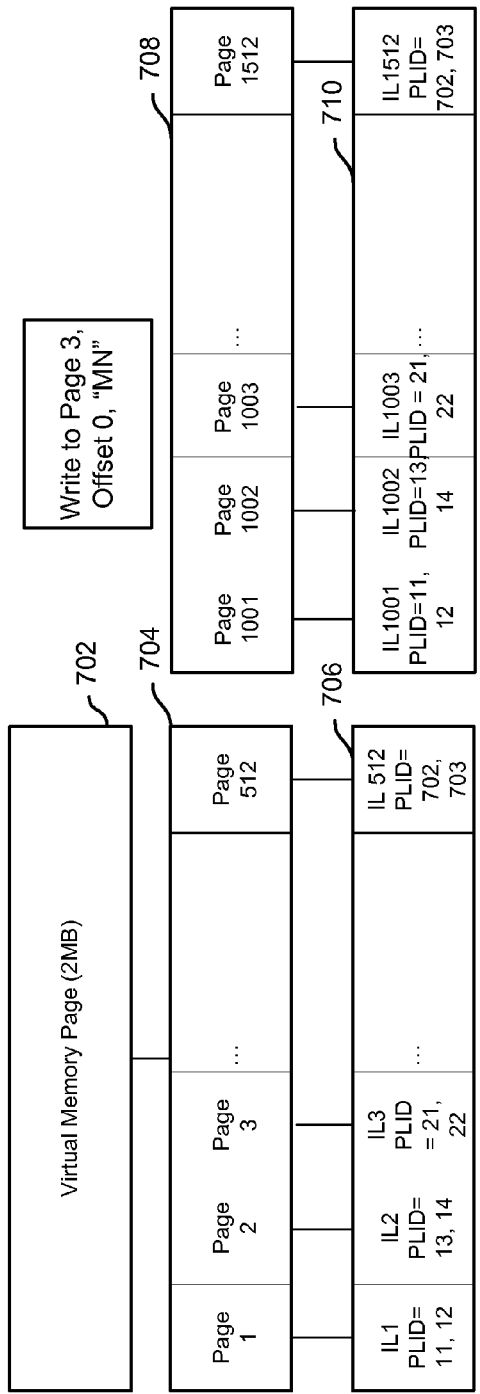
FIGS. 7A and 7B are data diagrams illustrating an example of copy-on-write operation for a virtual memory page that is greater than the physical memory page.
Figure 7B:
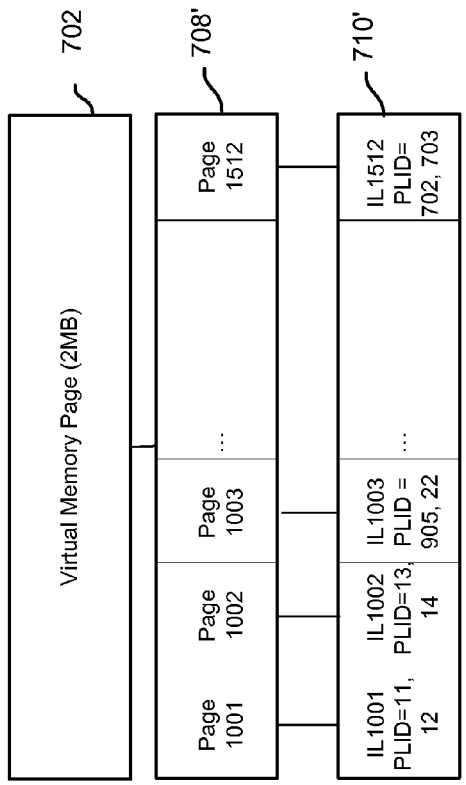

FIGS. 7A and 7B are data diagrams illustrating an example of copy-on-write operation for a virtual memory page that is greater than the physical memory page. In this example, virtual memory page 702 is 2 megabytes in size and the physical memory page is 4 kilobytes in size. Pages 704 include a contiguous block of 512 physical pages corresponding to the virtual memory page, where each physical page corresponds to a respective indirect line that is associated with data lines (the data lines are not shown in the example). In this case, pages 704 are shared with another virtual memory page (not shown); thus, virtual memory page 702 is marked as copy-on-write. The set of indirect lines are collectively referred to as 706. When a write request for modifying page 3 is received, a new page block 708 is created, where its pages and corresponding indirect lines are copies of 704 and 706. The content of the data lines do not need to be copied since each new indirect line 710 references the same data lines as its counterpart 706. As shown in FIG. 7B, the third physical page in page block 708 is modified according to the write request (specifically, the first data line of the third block changed from data line PLID 21 to data line PLID 905), virtual memory page 702 becomes associated with the new, updated page block 708' and indirect lines 710'.

In some embodiments, garbage collection is implemented (using, for example, a processor that may be a part of the memory module or coupled to the memory module). Data lines that are no longer referenced by any indirect line are reclaimed as free, and become available for subsequent allocation. A number of different ways to track data lines to be freed exist. In some embodiments, there is a reference count per shared data line, which is incremented when an indirect line adds a reference to a given data line, and decremented when a reference is removed. When the reference count reaches zero, the shared data line is freed or marked as freeable to be freed at a later time. In some embodiments, a scanning process periodically checks for references by indirect lines to data lines. If there is no references to a given data line, it is freed and made available for subsequent allocation.

While the physical pages are created to be unique, it is still possible for duplicate pages to exist in the system (for example, when a page's content is modified, the modified content can be the same as the content of another existing page). In some embodiments, a deduplication process periodically scans memory to detect any duplicate pages. For example, the hash values of the pages can be stored and compared. The deduplication process replaces each set of duplicates with a common shared page that is marked read-only/copy-on-write in place of the original duplicated pages, adds this shared page to the PPMC, and removes the duplicates.

A technique for memory sharing and page deduplication using indirect lines has been disclosed. Detecting duplicated data when a new physical page is created, using the PPMC is relatively simple to implement and avoids the overhead of detecting duplications in the memory hardware. The use of an indirect line and shared data lines allows efficient page copy-on-write, both in time and space, since copying the indirect line of the source page to the indirect line of the destination page does not require copying of the actual data content, and since only the modified data line is not shared between the source page and the destination page after the write operation completes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A memory system comprising:
   a memory to maintain a plurality of physical pages that reference a respective plurality of indirect lines, wherein each of the plurality of indirect lines corresponds to a set of one or more data lines, and wherein a data line in the set of one or more data lines is distinct from any of the plurality of physical pages; and
   a memory module coupled to the memory, to:
      in response to a request to create a new physical page:
         determine whether there is an existing physical page that has matching content as the new physical page, wherein the new physical page is distinct from any indirect line and is distinct from any data line, and the existing physical page is distinct from any indirect line and is distinct from any data line; and
      in the event that there is an existing physical page that has matching content as the new physical page, associate the new physical page with the same data lines as those corresponding to the matching content referenced by at least one indirect line associated with the existing physical page, wherein the new physical page is associated with the same data lines by associating the new physical page with the same at least one indirect line associated with the existing physical page, and wherein:
         the existing physical page, which is determined to have matching content as the new physical page, resides in a first memory space and references the at least one indirect line,
         the at least one indirect line resides in a second memory space that is separate from the first memory space, and
         the at least one indirect line references a set of data lines storing the matching content.

2. The system of claim 1, wherein each of the plurality of physical pages is created to include unique content.

3. The system of claim 1, wherein the data lines have immutable content.

4. The system of claim 1, wherein a virtual memory page that corresponds to the new physical page is marked as read-only or copy-on-write.

5. The system of claim 1, wherein the memory is further to maintain a physical page map collection (PPMC) to support lookup of specific physical pages.

6. The system of claim 5, wherein the PPMC includes a table that maps hash values of physical page content to physical pages.

7. The system of claim 5, wherein the PPMC includes a table that maps identifiers of physical page content to physical pages.

8. The system of claim 5, wherein the memory module to determine whether there is an existing physical page that has matching content as the new physical page includes to look up the existing physical page in the PPMC.

9. The system of claim 5, wherein in the event that there is an existing physical page that has matching content as the new physical page, the memory module is further to update the PPMC with the new physical page.

10. The system of claim 1, wherein a physical page and a virtual page are equal in size.

11. The system of claim 1, wherein a virtual page is greater in size than a physical page.

12. The system of claim 11, wherein the new physical page is one of a plurality of consecutive new pages that correspond to the virtual page.

13. The system of claim 1, wherein the new physical page is associated with an indirect line that references a data line filled with zeros.

14. The system of claim 1, wherein the memory module is further to:
   in response to a request to write content to a shared physical page:
      obtain a destination page;
      obtain a new indirect line that is an indirect copy of an indirect line associated with the shared physical page;
      determine an appropriate data line comprising at least a portion of the content to be written;
      associate the appropriate data line with the new indirect line;
      and associate the new indirect line with the destination page.

15. The system of claim 14, wherein the appropriate data line comprising at least a portion of the content to be written is identified among existing data lines.

16. The system of claim 14, wherein the appropriate data line comprising at least a portion of the content to be written is created.

17. The system of claim 14, wherein in response to the request to write content to the shared physical page, the memory module is further to update a physical page map collection (PPMC) that supports lookup of specific physical pages.

18. The system of claim 14, wherein the new indirect line is created before the request to write is initiated.

19. The system of claim 1, further comprising a processor to perform garbage collection on unreferenced data lines.

20. The system of claim 1, further comprising a processor to detect duplicated physical pages and perform deduplication.

21. A method of memory management, comprising:
   maintaining a plurality of physical pages that reference a respective plurality of indirect lines, wherein each of the plurality of indirect lines corresponds to a set of one or more data lines, and wherein a data line in the set of one or more data lines is distinct from any of the plurality of physical pages;
   receiving a request to create a new physical page;
   determining whether there is an existing physical page that has matching content as the new physical page, wherein the new physical page is distinct from any indirect line and is distinct from any data line; and the existing physical page is distinct from any indirect line and is distinct from any data line; and
   in the event that there is an existing physical page that has matching content as the new physical page, associating the new physical page with the same data lines as those corresponding to the matching content referenced by at least one indirect line associated with the existing physical page, wherein the new physical page is associated with the same data lines by associating the new physical page with the same at least one indirect line associated with the existing physical page, and wherein:
  the existing physical page, which is determined to have matching content as the new physical page, resides in a first memory space and references the at least one indirect line,
  the at least one indirect line resides in a second memory space that is separate from the first memory space, and
  the at least one indirect line references a set of data lines storing the matching content.

22. A computer program product for memory management, the computer program product being embodied in a tangible non-transitory computer readable storage medium and comprising computer instructions, which in response to execution by one or more processors, cause to:
  maintain a plurality of physical pages that reference a respective plurality of indirect lines, wherein each of the plurality of indirect lines corresponds to a set of one or more data lines, and wherein a data line in the set of one or more data lines is distinct from any of the plurality of physical pages;
  receive a request to create a new physical page;
  determine whether there is an existing physical page that has matching content as the new physical page, wherein the new physical page is distinct from any indirect line and is distinct from any data line, and the existing physical page is distinct from any indirect line and is distinct from any data line; and
  in the event that there is an existing physical page that has matching content as the new physical page, associate the new physical page with the same data lines as those corresponding to the matching content referenced by at least one indirect line associated with the existing physical page, wherein the new physical page is associated with the same data lines by associating the new physical page with a copy of the at least one indirect line associated with the existing physical page, and wherein:
  the existing physical page, which is determined to have matching content as the new physical page, resides in a first memory space and references the at least one indirect line,
  the at least one indirect line resides in a second memory space that is separate from the first memory space, and
  the at least one indirect line references a set of data lines storing the matching content.

23. The system of claim 1, wherein the memory module is further configured to, in the event that there is an existing physical page that has matching content as the new physical page, return the existing physical page to a requester who made the request.

24. The system of claim 1, wherein the set of one or more data lines are deduplicated.

25. The computer program product of claim 22, wherein the copy of the at least one indirect line associated with the existing physical page includes at least one new indirect line that is associated with the new physical page.

* * * * *